United States Patent
Wei et al.

(10) Patent No.: US 12,234,895 B2
(45) Date of Patent: Feb. 25, 2025

(54) DUAL-CLUTCH GEARBOX

(71) Applicant: ZHEJIANG LINIX MOTOR CO., LTD., Zhejiang (CN)

(72) Inventors: Zhonghua Wei, Dongyang (CN); Shan Du, Dongyang (CN); Yongfeng Chen, Dongyang (CN); Huichu Zhen, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 0 days.

(21) Appl. No.: 18/026,316

(22) PCT Filed: Dec. 21, 2021

(86) PCT No.: PCT/CN2021/139923
§ 371 (c)(1),
(2) Date: Mar. 14, 2023

(87) PCT Pub. No.: WO2022/257418
PCT Pub. Date: Dec. 15, 2022

(65) Prior Publication Data
US 2023/0349445 A1    Nov. 2, 2023

(30) Foreign Application Priority Data
Jul. 30, 2021    (CN) .......................... 202110875351.7

(51) Int. Cl.
*F16H 3/083*    (2006.01)
*F16H 1/22*    (2006.01)
*F16H 57/021*    (2012.01)

(52) U.S. Cl.
CPC .............. *F16H 3/083* (2013.01); *F16H 1/22* (2013.01); *F16H 57/021* (2013.01)

(58) Field of Classification Search
CPC . F16H 1/22; F16H 3/006; F16H 3/083; F16H 3/085; F16H 57/021; F16H 2057/02034; H02K 7/116
(Continued)

(56) References Cited

U.S. PATENT DOCUMENTS 3,203,521 A * 8/1965 Frank .................... F16D 27/112
192/48.91
3,301,366 A * 1/1967 Steinberg ................ F16D 11/10
192/69.82

(Continued)

FOREIGN PATENT DOCUMENTS

DE    1500488 A1 *    7/1967
DE    19730199 A1 *    1/1999 ............. F16H 3/083

OTHER PUBLICATIONS

English Translation of DE 1500488 A1 (Year: 1965).*
English Translation of DE 19730199 A1 (Year: 1997).*

*Primary Examiner* — Joseph Brown
(74) *Attorney, Agent, or Firm* — Jiwen Chen; Joywin IP Law PLLC

(57) ABSTRACT

A dual-clutch gearbox which can switch output shafts of two gearboxes, includes a box body in which a rotating shaft configured to receive torque from a drive motor is provided. Two gears, which are both in slip fit on the rotating shaft and respectively in linkage with the output shaft of one gearbox, are coaxially sleeved on the rotating shaft. A motion bar is fitted to and provided on the rotating shaft, a linkage piece in coaxial linkage with the rotating shaft is fixed at one end of the motion bar, and a driver is in linkage with the other end of the motion bar, so that the motion bar can move in its own axial direction under the action of the driver and allow the linkage of the linkage piece with one of the two gears.

2 Claims, 4 Drawing Sheets

(58) Field of Classification Search
USPC .............................. 74/370, 372, 333; 192/96
See application file for complete search history.

(56) References Cited

U.S. PATENT DOCUMENTS

| | | | | |
|---|---|---|---|---|
| 4,291,587 | A * | 9/1981 | Tachibana | F04D 25/02 |
| | | | | 74/369 |
| 4,919,244 | A * | 4/1990 | Bondioli | F16D 7/028 |
| | | | | 192/93 C |
| 5,560,250 | A * | 10/1996 | Hua | F16H 3/083 |
| | | | | 74/371 |
| 6,675,667 | B1 * | 1/2004 | Pelletier | F16D 21/04 |
| | | | | 192/93 C |
| 8,464,610 | B1 * | 6/2013 | Langenfeld | F16H 37/065 |
| | | | | 74/606 R |
| 2017/0284509 | A1 * | 10/2017 | Erhardt | F16H 3/083 |
| 2019/0234491 | A1 * | 8/2019 | Hirano | F16H 3/083 |

* cited by examiner

DUAL-CLUTCH GEARBOX

This is a U.S. national stage application of PCT Application No. PCT/CN2021/139923 under 35 U.S.C. 371, filed Dec. 21, 2021 in Chinese, claiming priority of Chinese Application No. 202110875351.7, filed Jul. 30, 2021, all of which are hereby incorporated by reference.

TECHNICAL FIELD OF THE INVENTION

The present invention relates to a dual-clutch gearbox which can switch output shafts of double gearboxes.

BACKGROUND OF THE INVENTION

In order to reduce labor costs and improve production efficiency, transfer robots are often used in warehouses for cargo handling. The transfer robot has a variety of motor functions each powered by a gear motor.

For example, an intelligent transfer robot disclosed in China Patent No. 201610373214.2 comprises a lifting motor and a drive motor. The robot can realize a lifting function by the lifting motor and a traveling function by the drive motor. Two motors and two gearboxes provided to realize different functions will take up too much space and are costly.

SUMMARY OF THE INVENTION

An object of the present invention is to provide a dual-clutch gearbox which can realize two different functions through one drive motor.

To achieve the above object, a technical solution employed in the present invention is as follows. A dual-clutch gearbox is provided, comprising a box body in which a rotating shaft configured to receive torque from a drive motor is provided; two gears, which are both in slip fit on the rotating shaft and respectively in linkage with an output shaft of one gearbox, are coaxially sleeved on the rotating shaft; a motion bar is fitted to and coaxially provided on the rotating shaft, a linkage piece in coaxial linkage with the rotating shaft is fixed at one end of the motion bar, and a driver is in linkage with the other end of the motion bar, so that the motion bar can move in its own axial direction under the action of the driver and allow the linkage of the linkage piece with one of the two gears.

The output shaft of one of the two gearboxes on the box body is configured to realize a lifting and lowering function, and the output shaft of the other gearbox is configured to realize a traveling function of a robot. When the robot only needs to travel, the driver drives the motion bar to move along its own axis, and the linkage piece at the end of the motion bar is fitted to one of the two gears, so that the rotating shaft is in linkage with the gear to drive the output shaft of the gearbox corresponding to the gear to rotate. When the robot needs to lift cargoes, the driver drives the motion bar to move along its own axis direction, so that the linkage piece is disengaged from one gear and linked with the other gear to drive the output shaft of the other gearbox to rotate. According to the present invention, only one drive motor is required, so that the output shafts of the two gearboxes can be used selectively to switch the two functions. Therefore, fewer gearboxes are used, and the drive motor and the gearboxes take up less space, to allow a smaller transfer robot. In addition, the driver in the invention only drives the motion bar to move linearly, and any of existing low-power and small-sized drive mechanisms may be adopted. The rotating shaft may be in direct linkage with an output shaft of the drive motor, and may also be a shaft of any one of the gearboxes in linkage with the drive motor. The linkage between the gear and the output shaft of the gearbox can be realized by the existing structure of any one of existing gearboxes.

Preferably, the rotating shaft is provided with a through hole running through an axial surface on one side, and a guide groove communicated with the through hole and extending in the axial direction of the rotating shaft is provided on two opposite sides of an outer wall of the rotating shaft, respectively; one end of the motion bar to which the linkage piece is fixed extends into the through hole, the linkage piece, with its ends coming out of the guide grooves, is in slip fit at the guide grooves, and the gears are both provided with a fitting structure fitted to the ends of the linkage piece. The rotating shaft and the motion bar are sleeved with each other to make the structure in the present invention more compact. The guide groove is configured to confine the rotation of the linkage piece relative to the rotating shaft.

Preferably, the fitting structure consists of a plurality of fitting grooves arranged radially on the gear around an axis of the gear. The fitting grooves are communicated with a central hole of the gear. With the plurality of the fitting grooves, the linkage piece extends into the fitting grooves easily.

Preferably, an opening of each fitting groove is of an open structure, and the openings of the two adjacent fitting grooves are connected by a cambered surface. Because of the open structure at the opening of the fitting groove, the ends of the linkage piece extend into the fitting grooves easily. The openings of the two adjacent fitting grooves are connected by the cambered surface without any right angle so that the gear in contact with the linkage piece has a smoother axial surface to make it easy for the linkage piece to move into the fitting grooves.

Preferably, an end face of the end of the linkage piece from its own axis to the gear side becomes closer to the outer wall of the rotating shaft. The above arrangement facilitates the linkage and matching between a portion of the linkage piece adjacent to the gear and the gear.

Preferably, the gears are fixed to the rotating shaft through a first bearing, a step structure and a first stopper, which are both configured to confine the axial movement of the first bearing along the rotating shaft, are provided on the rotating shaft. The first stopper may be a snap spring or other existing parts for confining bearings.

Preferably, one end of the motion bar away from the linkage piece is rotationally fixed to the movable plate, and the movable plate moves in the axial direction of the motion bar under the action of the driver. The motion bar can rotate synchronously with the linkage piece and the rotating shaft, so that the structure in the present invention may be simpler and smaller.

Preferably, a drive member capable of moving linearly is provided on an output end of the driver, is linearly parallel with the axial direction of the motion bar, and is connected to the motion bar through the movable plate. The driver is located on the side of the motion bar rather than on the axial side of the motion bar, which can make the structure in the present invention more compact.

Preferably, the movable plate is provided with a hold-down groove for fixing a second bearing, the motion bar is rotationally fixed to the movable plate through the second bearing, a mounting hole at which a bolt-like fixture is fixed is formed on an axial end face of the motion bar, the fixture includes an inner fixture segment extending into the mounting hole and an outer fixture segment always located outside the mounting hole; and the motion bar includes a thick segment, and a thin segment fixed to an inner race of the second bearing, and the second bearing is confined between the thick segment of the motion bar and the outer fixture segment. The motion bar and the movable plate are connected and fixed by fitting the motion bar, the fixture and the second bearing, so as to make the structure in the present invention simple and easy to assemble.

Preferably, one end of the motion bar away from the linkage piece comes out of the box body, an oil seal is provided between the box body and the motion bar, and the driver is provided outside the box body. The driver is provided outside the box body, so that there is no need to consider the sealing between lubricant in the box body and the driver, the box body can be made smaller, and less lubricant is required for the box body. An oil seal is provided between the motion bar and the box body, which can prevent foreign matters from entering the box body and ensure the smooth axial movement of the motion bar.

According to the present invention, the output shafts of the two gearboxes can be used selectively to switch the two functions, and the advantages are that fewer gearboxes are used, the drive motor and the gearboxes take up less space, and the structure is more compact.

DETAILED DESCRIPTION OF THE INVENTION

The present invention will be further described as below with reference to the accompanying drawings by embodiments.

Figure 1:
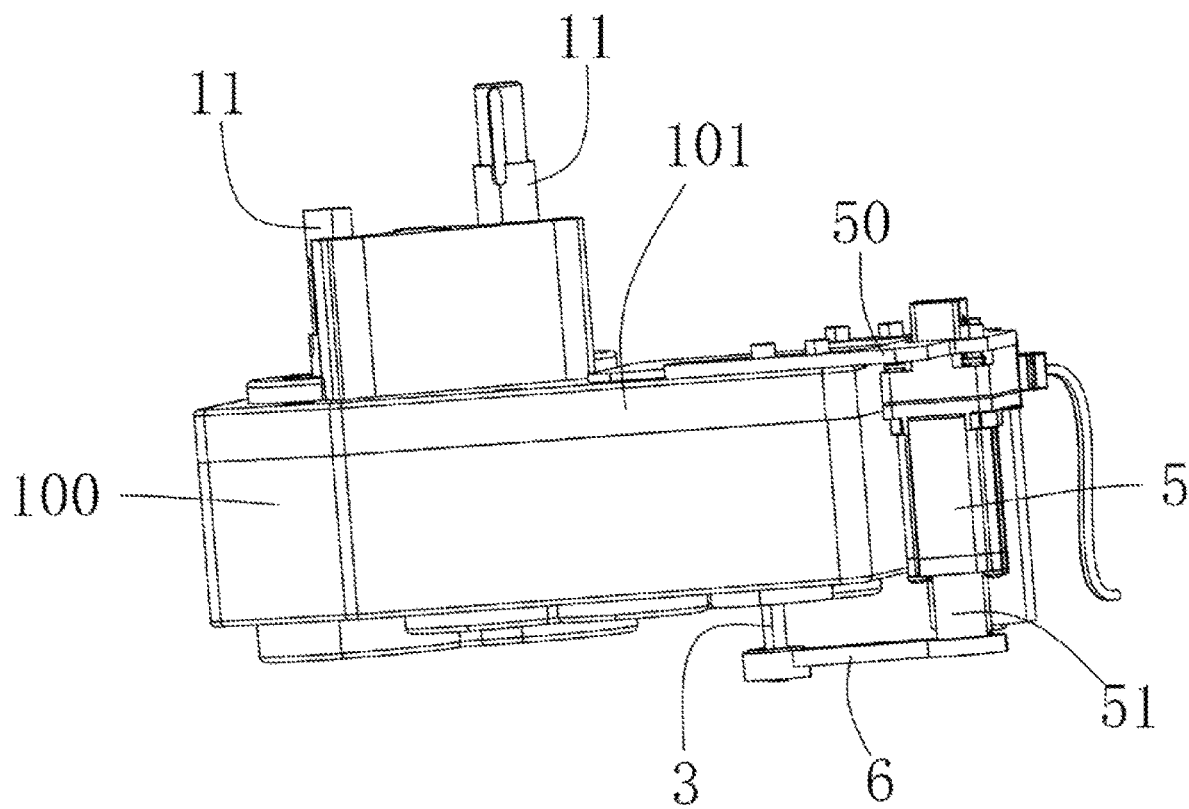
FIG. 1 is a structural diagram of a gearbox according to the present invention.
Figure 2:
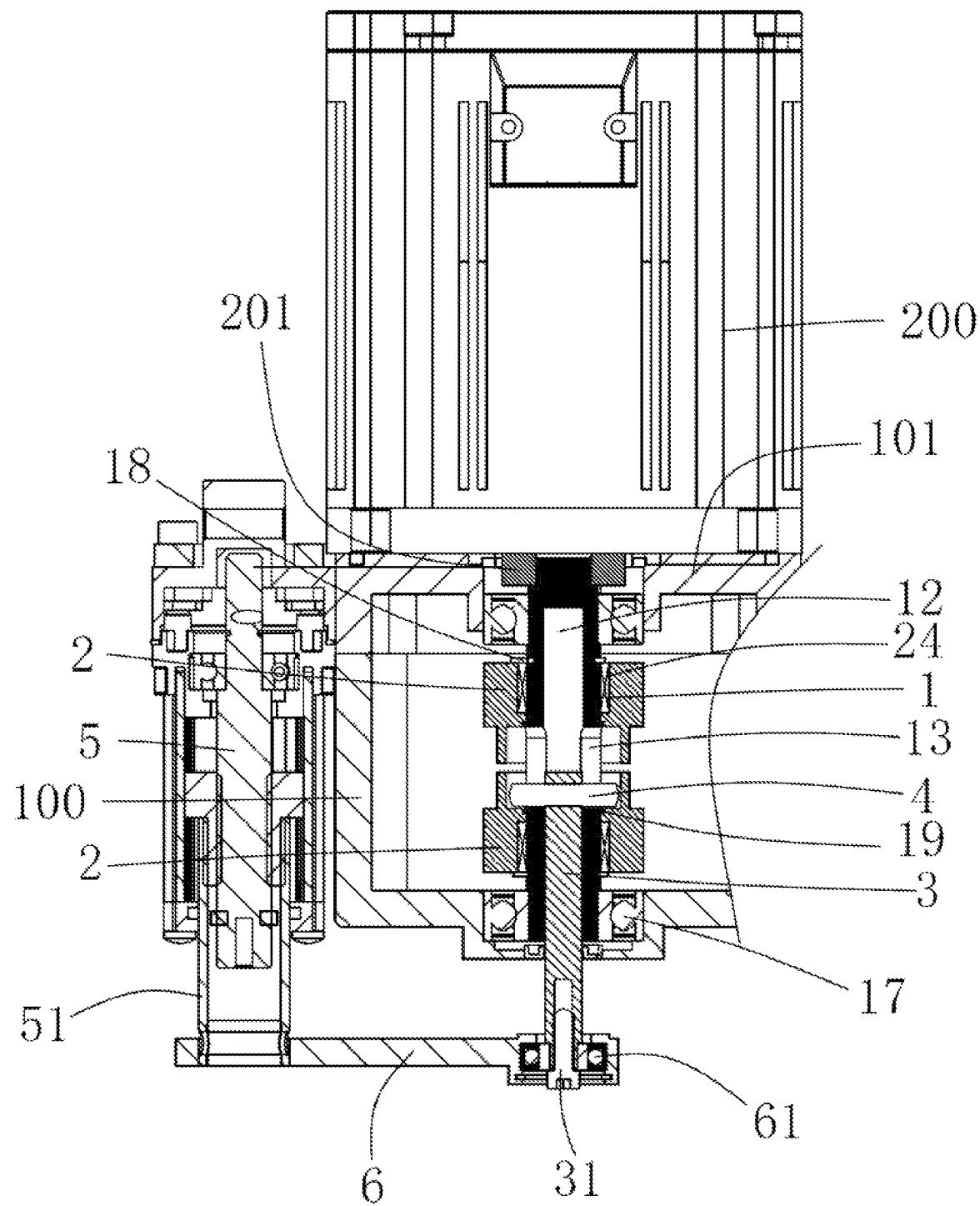
FIG. 2 is a sectional view according to the present invention.
Figure 3:
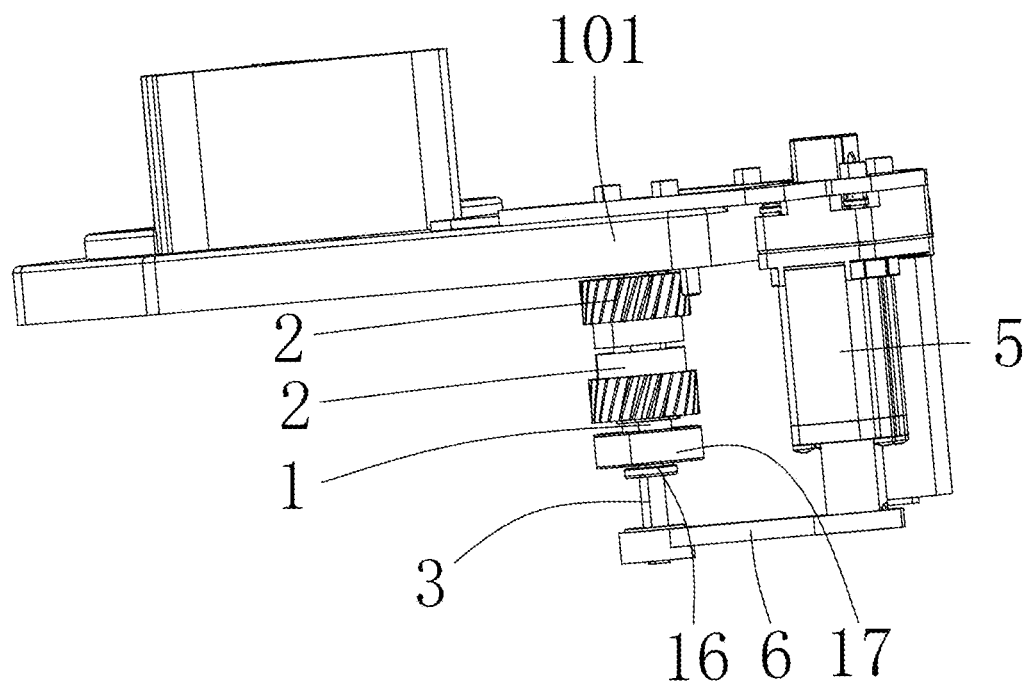
FIG. 3 is a structural diagram when a driver is in linkage with a motion bar according to the present invention.

As shown in FIGS. 1 to 3, a dual-clutch gearbox is provided in the present invention, comprising a box body 100 and a box cover 101. A rotating shaft 1 configured to receive torque from an output shaft 201 of a drive motor 200 is provided in the box body 100, two gears 2, which are both in slip fit on the rotating shaft 1 and respectively in linkage with an output shaft 11 of one gearbox, are coaxially sleeved on the rotating shaft 1. A motion bar 3 is fitted to and coaxially provided on the rotating shaft 1, a linkage piece 4 in coaxial linkage with the rotating shaft 1 is fixed at one end of the motion bar 3, and a driver 5 is in linkage with the other end of the motion bar 3, so that the motion bar 3 can move in its own axial direction under the action of the driver 5 and allow the linkage of the linkage piece 4 with one of the two gears 2. A step structure 19 and a first stopper 18, which are both configured to confine the axial movement of a first bearing 24 along the rotating shaft, are provided on the rotating shaft 1. Both ends of the rotating shaft 1 are rotationally fixed to the box body 100 and the box cover 101 through a third bearing 17.

As shown in FIG. 2, the rotating shaft 1 is provided with a through hole 12 running through an axial surface on one side, and a guide groove 13 communicated with the through hole 12 and extending in the axial direction of the rotating shaft 1 is provided on two opposite sides of an outer wall of the rotating shaft 1, respectively. One end of the motion bar 3 to which the linkage piece 4 is fixed extends into the through hole 12, the linkage piece 4, with its ends coming out of the guide grooves 13, is in slip fit at the guide grooves 13, and the gears 2 are both provided with a fitting structure fitted to the ends of the linkage piece 4.

Figure 4:
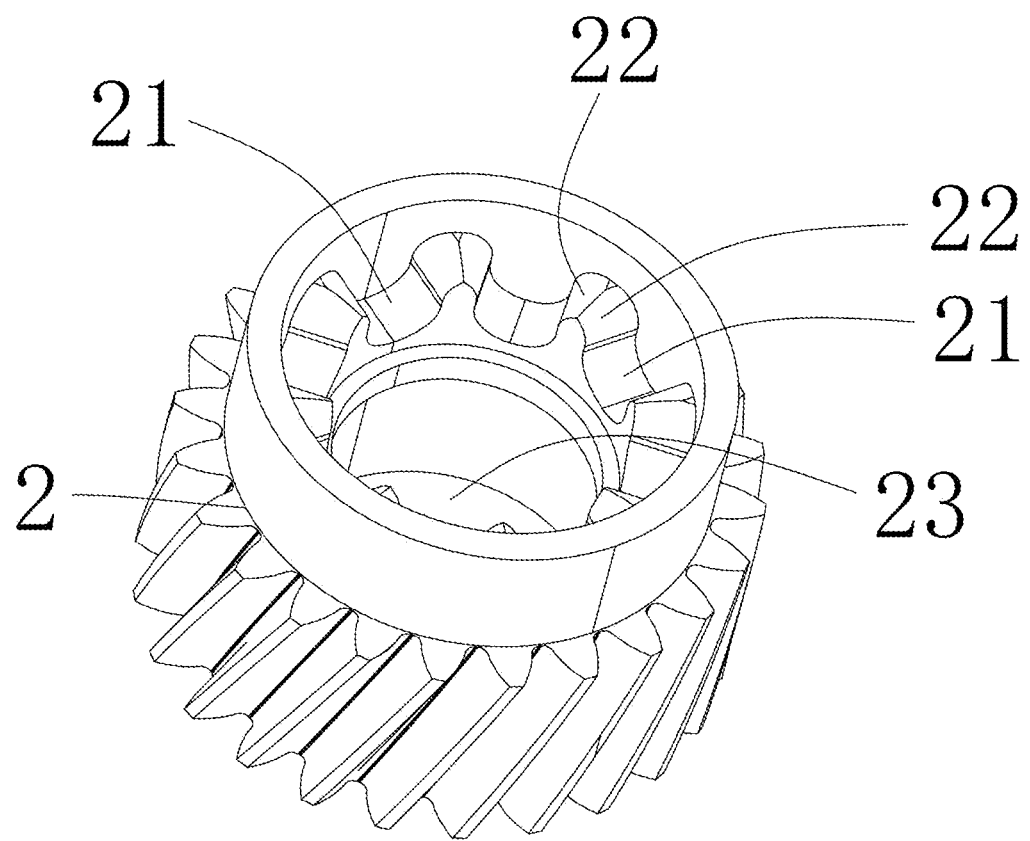
FIG. 4 is a structural diagram of a gear according to the present invention.

As shown in FIGS. 2 to 4, the fitting structure consists of a plurality of fitting grooves 21 arranged radially on the gear 2 around an axis of the gear 2, and the fitting grooves 21 are communicated with a central hole 23 running axially through the gear 2, and are evenly spaced around the axis of the gear 2. An opening of each fitting groove 21 is of an open structure, and the openings of the two adjacent fitting grooves 21 are connected by a cambered surface 22. The fitting grooves 21 are provided at positions where the two gears 2 are adjacent to each other.

As shown in FIGS. 2 and 3, the linkage piece 4 is of a cylindrical pin structure, and an end face (axial surface) of the end of the linkage piece 4 from its own axis to the gear 2 side becomes closer to the outer wall of the rotating shaft. The end face of the linkage piece 4 is of a conical surface structure with a convex middle and edges closer to the rotating shaft 1 than the middle.

Figure 5:
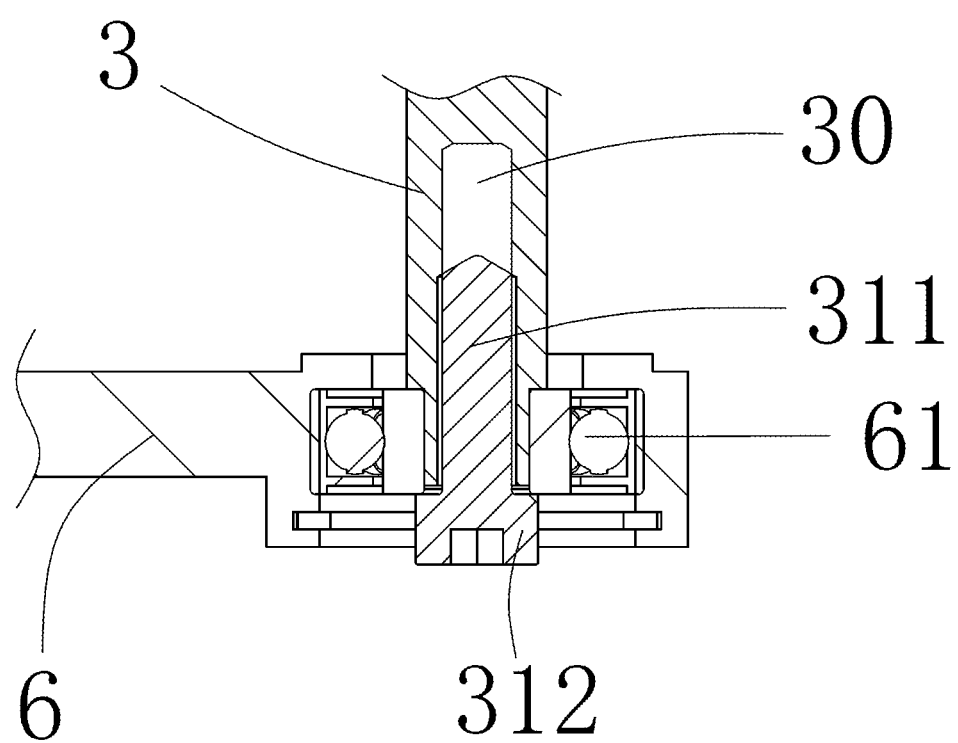
FIG. 5 is a structural diagram of a second bearing of a movable plate according to the present invention.

As shown in FIGS. 2, 3 and 5, one end of the motion bar 3 away from the linkage piece 4 is rotationally fixed to the movable plate 6, and the movable plate 6 moves in the axial direction of the motion bar 3 under the action of the driver 5. The driver 5 is an electric drive pusher. A drive member 51 capable of moving linearly is provided on an output end of the driver 5, is linearly parallel with the axial direction of the motion bar 3, and is connected to the motion bar 3 through the movable plate 6. One end of the motion bar 3 fixed to the movable plate 6 is located outside the box body 100, and an oil seal 16 is provided between the box body 100 and the motion bar 3. The driver 5 is provided outside the box body 100 and fixed to the box cover 101 through a mounting plate 50.

The movable plate 6 is provided with a hold-down groove for fixing a second bearing 61, the motion bar 3 is rotationally fixed to the movable plate 6 through the second bearing 61, a mounting hole 30 at which a bolt-like fixture 31 is fixed is formed on an axial end face of the motion bar 3, the fixture 31 includes an inner fixture segment 311 extending into the mounting hole and an outer fixture segment 312 always located outside the mounting hole 30. The motion bar 3 comprises a thick segment, and a thin segment fixed to an inner race of the second bearing 61, and the second bearing 61 is confined between the thick segment of the motion bar 3 and the outer fixture segment 312.

According to the present invention, the output shafts of the two gearboxes can be used selectively to switch the two functions, and the advantages are that fewer gearboxes are used, the drive motor and the gearboxes take up less space, and the structure is more compact.

The invention claimed is:

1. A dual-clutch gearbox, comprising a box body in which a rotating shaft configured to receive torque from a drive motor is provided, wherein two gears are both in slip fit on the rotating shaft and coaxially sleeved on the rotating shaft; a motion bar is fitted to and coaxially provided on the rotating shaft, a linkage piece in coaxial engagement with the rotating shaft is fixed at one end of the motion bar, and a driver is in linkage with another end of the motion bar, so that the motion bar can move in its own axial direction under an action of the driver and allow the linkage of the linkage piece with one of the two gears;

wherein the rotating shaft is provided with a through hole running through an axial surface on one side, and a guide groove communicated with the through hole and extending in an axial direction of the rotating shaft is provided on two opposite sides of an outer wall of the rotating shaft, respectively; the one end of the motion bar to which the linkage piece is fixed extends into the through hole, the linkage piece, with its ends coming out of the guide grooves, is in slip fit at the guide grooves, and each of the two gears comprises a fitting structure fitted to the ends of the linkage piece;
   wherein the fitting structure consists of a plurality of fitting grooves arranged radially on the gear around an axis of the gear;
   wherein an end face of an end of the linkage piece from its own axis to the gear side becomes closer to the outer wall of the rotating shaft;
   wherein an opening of each fitting groove is of an open structure, and the openings of two adjacent fitting grooves are connected by a cambered surface;
   wherein the gears are fixed to the rotating shaft through a first bearing, a step structure and a first stopper are provided on the rotating shaft, both the step structure and the first stopper are configured to confine an axial movement of the first bearing along the rotating shaft;
   wherein the other end of the motion bar away from the linkage piece is rotationally fixed to a movable plate, and the movable plate moves in the axial direction of the motion bar under an action of the driver;
   wherein a drive member capable of moving linearly is provided on an output end of the driver, is linearly parallel with the axial direction of the motion bar, and is connected to the motion bar through the movable plate; and
   wherein the movable plate is provided with a hold-down groove for fixing a second bearing, the motion bar is rotationally fixed to the movable plate through the second bearing, an axial end face of the motion bar is provided with a mounting hole, a bolt fixture is fixed with the mounting hole, the bolt fixture comprises an inner fixture segment extending into the mounting hole and an outer fixture segment always located outside the mounting hole; and the motion bar comprises a thick segment, and a thin segment fixed to an inner race of the second bearing, and the second bearing is confined between the thick segment of the motion bar and the outer fixture segment.

2. The dual-clutch gearbox according to claim 1, wherein the other end of the motion bar away from the linkage piece comes out of the box body, an oil seal is provided between the box body and the motion bar, and the driver is provided outside the box body.

\* \* \* \* \*